June 20, 1933.  G. LASKER  1,914,922
BOILER
Filed May 29, 1931  5 Sheets-Sheet 1

Witness:
William P. Kilroy

Inventor
George Lasker
Hill, Hill
By
Attys

June 20, 1933.　　　G. LASKER　　　1,914,922
BOILER
Filed May 29, 1931　　　5 Sheets-Sheet 3

Witness:
William P. Kilroy

Inventor:
George Lasker
Hill, Hill
By
Attys

June 20, 1933.　　　G. LASKER　　　1,914,922
BOILER
Filed May 29, 1931　　　5 Sheets-Sheet 4

Witness:
William P. Kilroy

Inventor:
George Lasker
By Hill. Hill
Attys

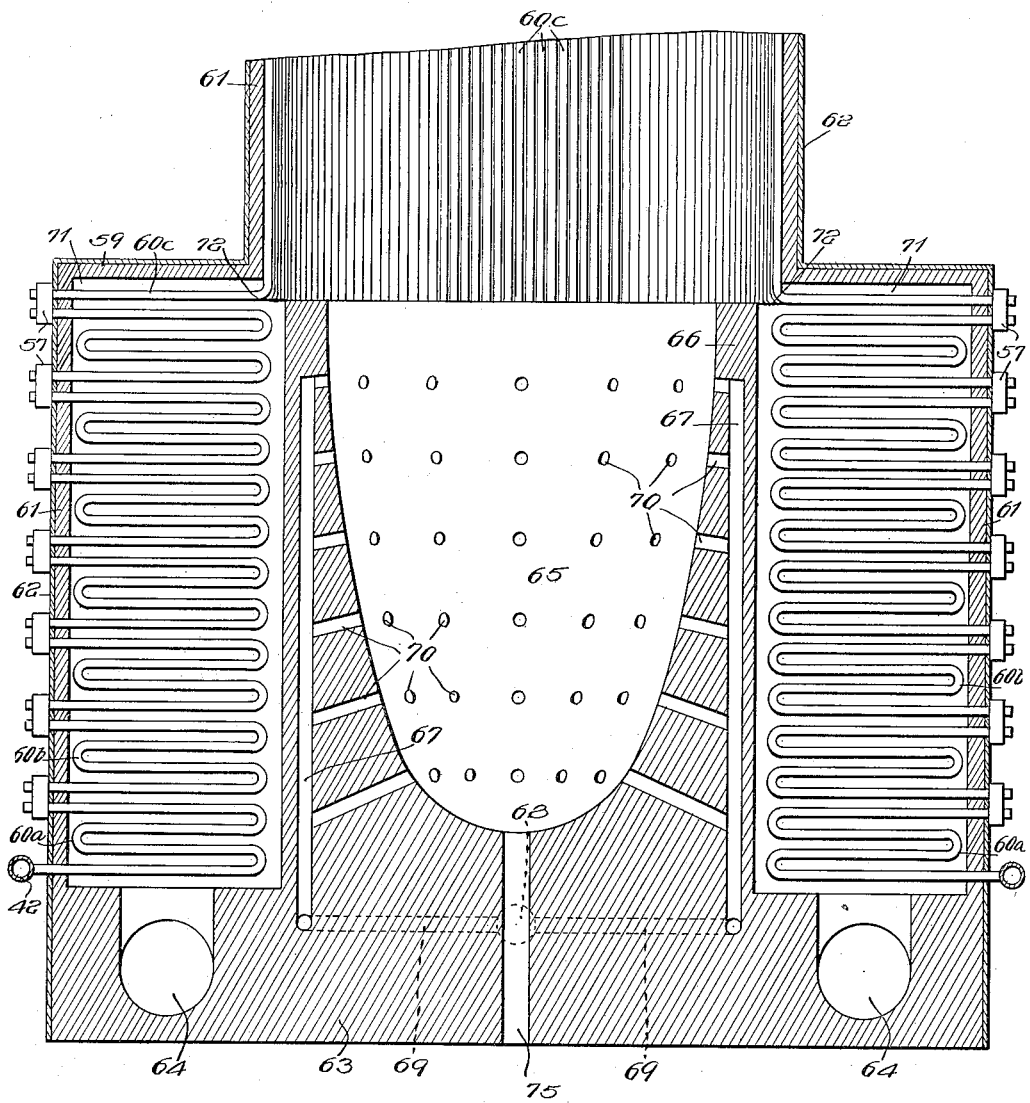

Patented June 20, 1933

1,914,922

UNITED STATES PATENT OFFICE

GEORGE LASKER, OF CHICAGO, ILLINOIS

BOILER

Application filed May 29, 1931. Serial No. 540,962.

The invention relates to heat absorbing devices and more particularly it relates to devices operable to vary the critical point of vaporization of a liquid by changing the pressure to which the liquid is subjected. The device provides efficient and novel means for varying the temperature of a liquid through a wide range without permitting it to vaporize, this result being accomplished by correspondingly changing the pressures to which the liquid is subjected so that the liquid reaches the desired temperature at a pressure higher than the critical.

The device provides means for raising water to very high temperatures without forming steam or vapor, the only limit to the range of temperature being the strength of the materials forming the walls enclosing the confined liquid. While the device is shown and described as a water heater, it is equally adapted for use in many manufacturing processes involving chemical reactions and physical changes wherein high temperatures without vaporization are desirable, as well as where a wide range of temperature without loss of liquefaction is essential.

The conversion of the liquid into steam or vapor is prevented by subjecting the liquid to a pressure in excess of that which corresponds to the conversion temperature, the limits of such maximum temperatures and pressures being controlled by the heat and pressure resisting qualities of the material of which the absorber is constructed. Any of the ordinary metals such as iron, steel, copper, aluminum, or their several alloys, may be used in the construction of a boiler or heat absorber for water, while in manufacturing processes involving chemical reactions and physical changes, other materials which are inert to the chemicals may be used within the limits of their capacity such for example as porcelain or other similar refractory materials.

An object generally of the invention is the provision of an improved heat absorbing device of the kind described wherein the temperature of the contained liquid may be raised or lowered to substantially its upper and lower limits at one pass through the device without loss of liquefaction.

It is well known to those familiar with the art that water provides an efficient medium for heat absorption for temperatures as high as eight hundred degrees Fahrenheit and another object of the invention is the provision of an improved device for raising water without loss of liquefaction to a temperature of eight hundred degrees Fahrenheit or higher, the upper limit of such temperatures being determined by the strength of the materials forming the tubes and headers within which the water is caused to circulate as it is heated.

It is found in practice that water can be raised from a temperature of sixty to a temperature of approximately eight hundred degrees Fahrenheit without conversion into steam, by one pass of the water under proper pressure through a pipe of one inch diameter having a length of approximately four hundred feet and that the same results are accomplished with pipes of larger or smaller diameters having their lengths correspondingly greater or less than four hundred feet. A further object of the invention is the provision of an improved boiler construction comprising a plurality of such tubes extending vertically and arranged side by side in closely spaced relation to form water cooled walls bounding the incandescent zone of the furnace, with the main lengths of each tube forming radially extending coils positioned in and substantially filling the dark zone of the furnace. The furnace is so arranged that the lighter gases of highest temperatures contact with the closely spaced upper ends of the tubes forming a lining for the dome like cover of the furnace, and the slightly heavier and cooler gases contact with that portion of the tubes lining the side walls of the furnace. There is a slow but perceptible movement of the gradually cooling relatively hot gases in a general direction opposite the flow of water in the tubes. The general construction of the furnace is such that the tubes comprising the heat absorber and forming a water cooled lining for the furnace, provide a construction similar in appearance to a bird cage. The construction shown is of the down draft type in which the water is raised to the desired temperature by one pass upwardly through a continuous tube, the ascending water being subjected to increasingly higher temperatures. While shown as a down draft type boiler the construction is adapted for the heating of water in a single pass through oppositely flowing gases in any direction. The arrangement of the tubes and furnace is such that water can be raised to a temperature of eight hundred degrees Fahrenheit at its exit point from the incandescent zone, which temperature has been found by experiments to be the upper limit at which water is an efficient heat absorber.

A predetermined constant pressure may be maintained in the heat absorber by pumps arranged to discharge through an open inlet orifice. The inlet orifice is arranged to maintain a constant flow of measured capacity. The discharge end of the absorber is fitted with an orifice plate or block of a size to permit discharge of the liquid at all times when the liquid has reached the desired temperature and in the desired quantities. The device further contemplates a constant uniform flow of the liquid through the absorber at a predetermined pressure and a predetermined temperature, which results are accomplished by a furnace control so arranged, that a rise in temperature will correspondingly retard or diminish the amount of heat released by the furnace. The inlet and discharge controls are shown diagrammatically inasmuch as the invention herein claimed and described is confined to the construction and arrangement of the boiler and furnace comprising the heat absorber proper.

The greater portion of each continuous tube is formed into a coil positioned in the lower or dark zone portion of the furnace. The coils substantially fill the dark zone and the water flowing through the coils is elevated very slowly. The ascending water is thereby caused to effectively abstract all of the heat from the relatively cool gases of the dark zone. The portions of the conduits in the incandescent zone of the furnace are closely spaced and the lengths of the uncoiled portions are such that the water in passing therethrough is raised to the desired maximum temperature.

A still further object of the invention is the provision of a plurality of tubes each forming a single pass for water through the dark and incandescent zone of the furnace in turn, said tubes being arranged in coils in the dark zone and forming a water cooled lining in the incandescent zone, the proportionate lengths of the conduit forming coils and providing a lining being such as to efficiently heat the water with a minimum volume of furnace space.

Still another object of the invention is the production of a heat absorber of the kind described which is simple, compact, durable, reliable, efficient and satisfactory for its intended purpose.

Many other objects and advantages of the construction herein shown and described will be obvious to those skilled in the art from the disclosure herein given.

To this end my invention consists in the novel construction, arrangement and combination of parts herein shown and described, and more particularly pointed out in the claims.

In the drawings wherein like reference characters indicate like or corresponding parts, Fig. 1 is a diagrammatic view of the structure embodying my invention;

Fig. 5 is a sectional view of an alternative embodiment of the invention.

Figure 1:
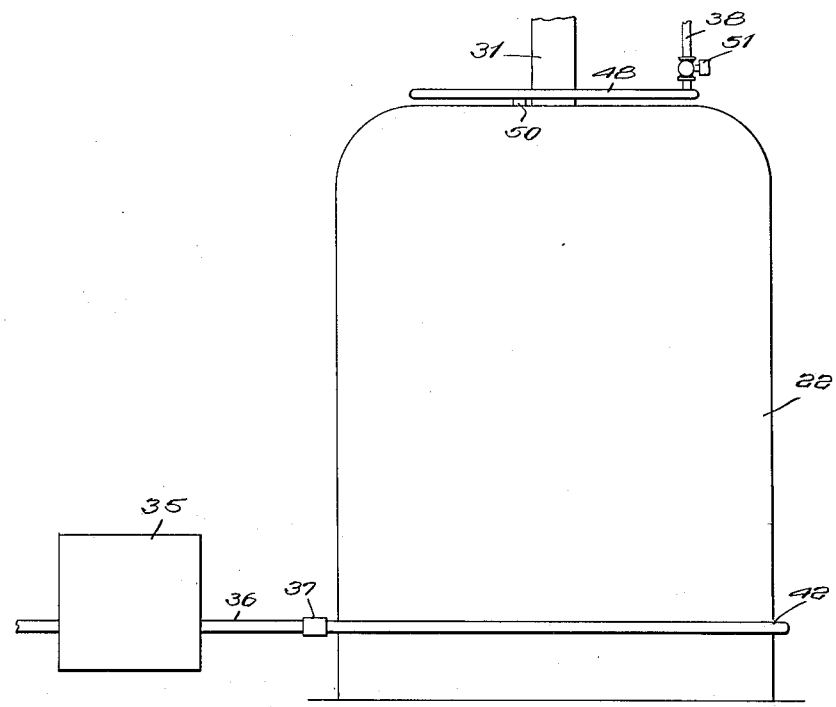

Referring now more particularly to the drawings the invention is embodied in a cylindrical furnace having a side wall 20, a cover 21, and a floor 23 constructed of fireproof material. The wall 20 and the cover 21 are covered by suitable insulating material 22 and the floor 23 is preferably constructed of slag or similar material providing a bottom for a hearth 28. The hearth 28 is bounded by a side wall 24 which extends upwardly a substantial distance. The outer surface of the side wall 24 is cylindrical and preferably concentric with the side wall 20 of the furnace. The outer diameter of the hearth 28 is such that an annular space 32 of substantial width surrounds the hearth and provides a dark zone of considerable depth through which the downwardly descending gases travel.

Fuel is supplied to the furnace by means of a central inlet conduit 31 opening through the cover 21 but if desired a plurality of smaller fuel supply conduits may be spaced at intervals in the cover as a substitute for the single central conduit. The fuel may be either gas, oil, powdered coal, or similar material, delivered through the conduit 31 with air under pressure and in the proper proportions for complete combustion. The central portion of the furnace underneath the conduit 31 thereby becomes a combustion chamber and the rate of combustion may be accelerated and controlled by a supplementary air supply under force draft provided through the hearth 28. For this purpose the side walls 24 of the hearth 28 have a plurality of radially extending tuyères 27 which connect the hearth with an annular space 26 formed in the wall 24. The supplementary air supply is delivered under pressure to the space 26, from a source (not shown), through a main conduit 30 and a plurality of branch conduits 29 which connect the space 26 with the main conduit.

The amount of fuel, the supply of air under forced draft, and the proportions and construction of the furnace and the hearth are such that temperatures causing higher than eight hundred degrees Fahrenheit are maintained in the upper portions of the furnace. The lighter hot gases form a layer adjacent the cover 21 and an envelope of gases of slightly lower temperatures collect about the side wall 20. The layers of hot gases adjacent the cover and the side wall are gradually lowered in temperature and as they cool and become heavier the gases move downwardly along the side wall 20 and enter the dark zone 32. A plurality of conduits 33 formed in the floor 23 of the furnace provide outlets through which the cool gases escape from the dark zone into a flue (not shown).

The major portion of the solid products of combustion are carried away by the gases escaping through the conduits 33. The hearth 28 provides a precipitating chamber in which the residue collects and from which it may be removed at intervals through a door 34. The capacity of the hearth 28 below the tuyères 27 is such that removal of the residue is necessary only at more or less prolonged intervals.

The water to be heated is fed into the furnace at the bottom of the dark zone 32 at points substantially coincident with the last pass of gas. For this purpose a circular feed pipe 42 is provided which entirely encircles the furnace near the bottom of the zone 32. The pipe 42 is connected with a water supply (not shown) and is the lower terminus for a plurality of vertically extending tubes 56. The tubes 56 each provide a single pipe conduit through which water is conducted from the feed pipe 42 upwardly through the furnace and out through the cover 21 where they discharge into one or the other of a plurality of headers 50. The conduits 56 are each approximately four hundred feet long and are preferably of one inch diameter, that being the ratio of the length of the diameters which it is found in practice will enable the water to be heated to the desired temperature in one pass through the conduit. If pipes of smaller or larger diameter than one inch are used the lengths will be correspondingly diminished or increased to provide a construction which permits the water to abstract the heat from the gases until the water is heated to a temperature of eight hundred degrees Fahrenheit that being approximately the temperature above which the water is no longer an efficient heat absorber. Each conduit comprises a lower pipe section 56a, a plurality of pipe sections 56b, and an upper pipe section 56c, all connected by headers 57. The required length of the conduits 56 makes it desirable for economy of manufacture and facility of installation that the conduit be constructed from a plurality of pipe sections. The number of conduits 56 in a given installation will vary with the size of the furnace and the capacity of the absorber, and in the embodiment shown one hundred sixty-eight of the conduits 56 are provided. The feed pipe 42 is large enough to supply all of the conduits 56 with sufficient water to permit the absorber to work at its maximum capacity.

The sections 56a and 56b are each constructed from a section of pipe arranged to form a plurality of overlying horizontal lengths alternately connected at opposite ends to form a coil. The coils are positioned one above the other in vertical diametrical planes and are closely spaced laterally so that they substantially fill the dark zone 32. The pipe sections 56a and 56b comprise the major portion of the conduits 56. The arrangement of the pipe sections is such that substantially all of the heat is abstracted from the gases by the contents of the conduits in the dark zone. The upwardly flowing water contained in the sections 56a and 56b thereby leaves the dark zone and enters the sections 56c at a relatively high temperature.

The sections 56c are closely spaced to form a water cooled lining for the side wall 20 and the cover 21. The envelope of gases adjacent the sections 56c has its highest temperature at the top where the sections emerge from the furnace. The temperature of the gaseous envelope gradually diminishes downwardly and at any particular point is always higher than the temperature of the adjacent ascending water. The water contents of the sections 56c is thereby caused to travel through an increasingly hotter zone until such water contents have reached a temperature of eight hundred degrees Fahrenheit.

The upper ends of the sections 56c project through the cover 21 and each terminates in one of a plurality of headers 50. Eight of the headers 50 are provided in close parallel relation to the cover 21 along substantially radial lines. Each header terminates at its outer end in a circular pipe 48 and at their inner end the headers terminate in a circular pipe 49, surrounding the fuel inlet conduit 31. The arrangement of outer and inner circular pipes 48 and 49, connected by the headers 50 equalizes the pressure in the sections 56c and permits the water to be discharged, from the pipe 48, through a pipe 38 under uniform pressure conditions. The arrangement of headers 50 along substantially radial lines permit the sections 56c to be closely spaced about the furnace wall 20 and to converge inwardly to form a lining for the cover 21 without overlapping.

An outlet orifice 51 controls the flow of the water from the pipe 48 into the discharge pipe 38 and an orifice 37 similarly controls the flow of water from a supply pipe line 36 to the feed pipe 42. A pump 35 positioned in the pipe line 36, forces the water upwardly through the conduits 56 at a pressure, above the critical pressure corresponding to a temperature of eight hundred degrees Fahrenheit. The orifices 37 and 51 and the pump 35 are shown diagrammatically.

An alternative embodiment of the invention is shown in Fig. 5 wherein the furnace is bounded by a side wall 61 having a horizontal offset portion 59. The horizontal portion 59 forms a cover for a dark zone 71, positioned between the lower portion of the side wall 61 and a side wall 66 bounding a centrally positioned hearth 65. A plurality of coils 60a and 60b are arranged in vertical alignment in the dark zone 71 in a manner similar to that of the coils 56a and 56b in the embodiment above described. The vertically aligned coils 60a and 60b are connected by headers 57 and a plurality of conduit sections 60c connected one with each of the uppermost headers 60b, extend upwardly to form a lining for the upper small diametered end of the furnace wall 61. Water is supplied to the conduits 60 through a feed pipe 42 and the general arrangement of the conduits 60 and the construction and arrangement of their inlet and outlet controls is similar to that shown and described in Figs. 1 to 4 inclusive.

The space between the upper end of the hearth wall 66 and the inner edge of the horizontal wall portion 59 provides a substantially annular shaped opening or passage way 72, connecting the upper radiant heat zone with the dark zone 71.

Figure 2:
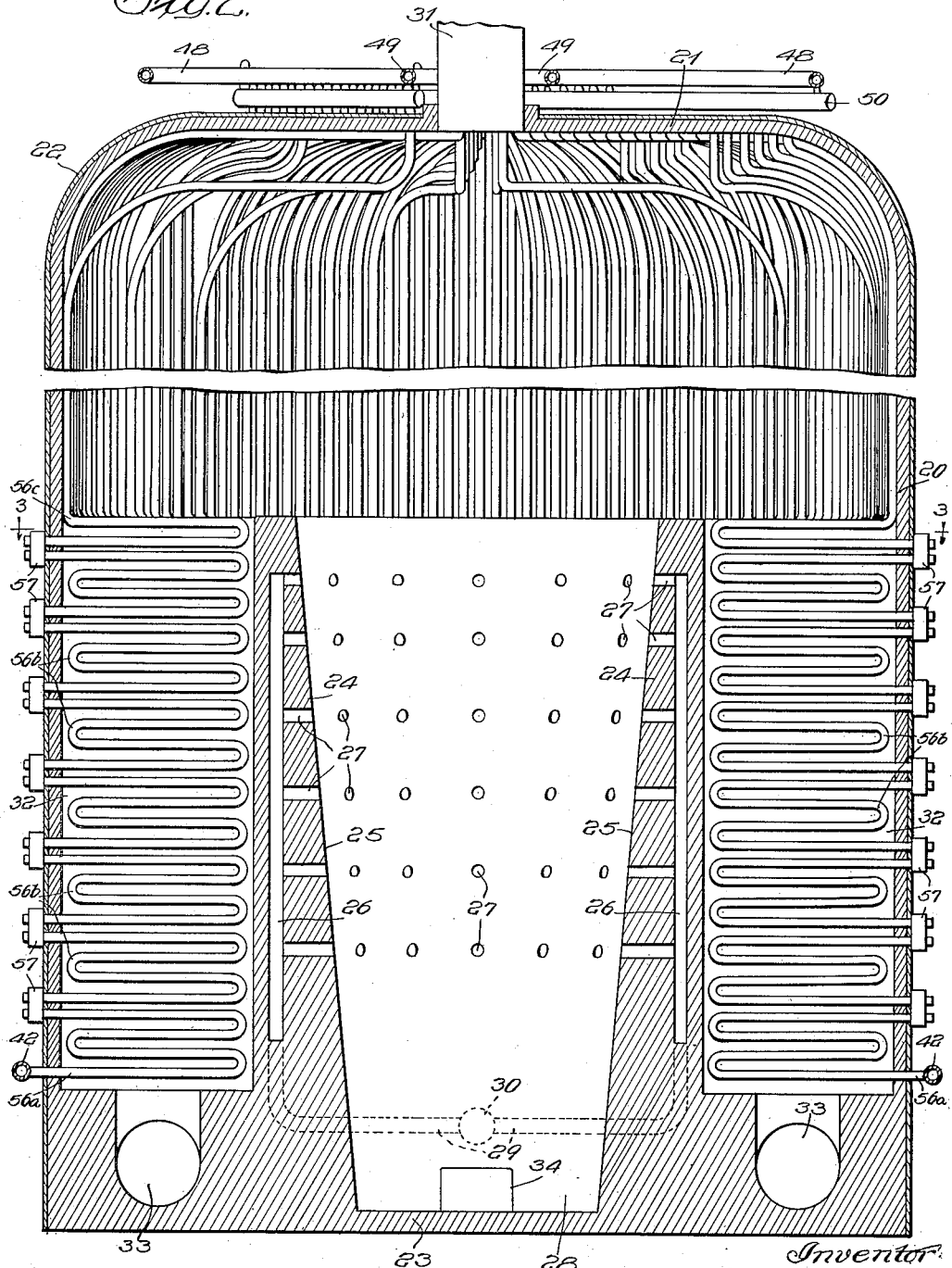
Fig. 2 is a vertical sectional view through a structure illustrating one embodiment of my invention.
Figure 3:
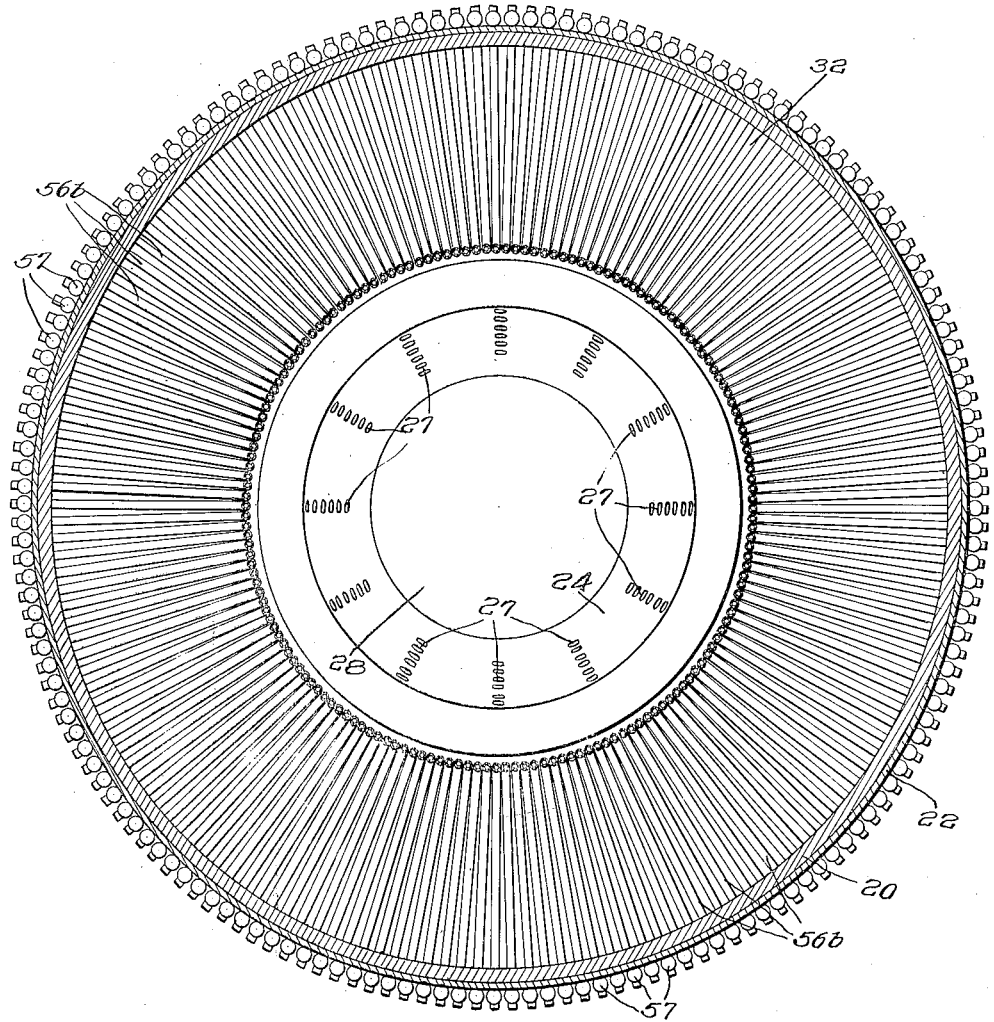
Fig. 3 is a sectional view along the line 3—3 of Fig. 2.
Figure 4:
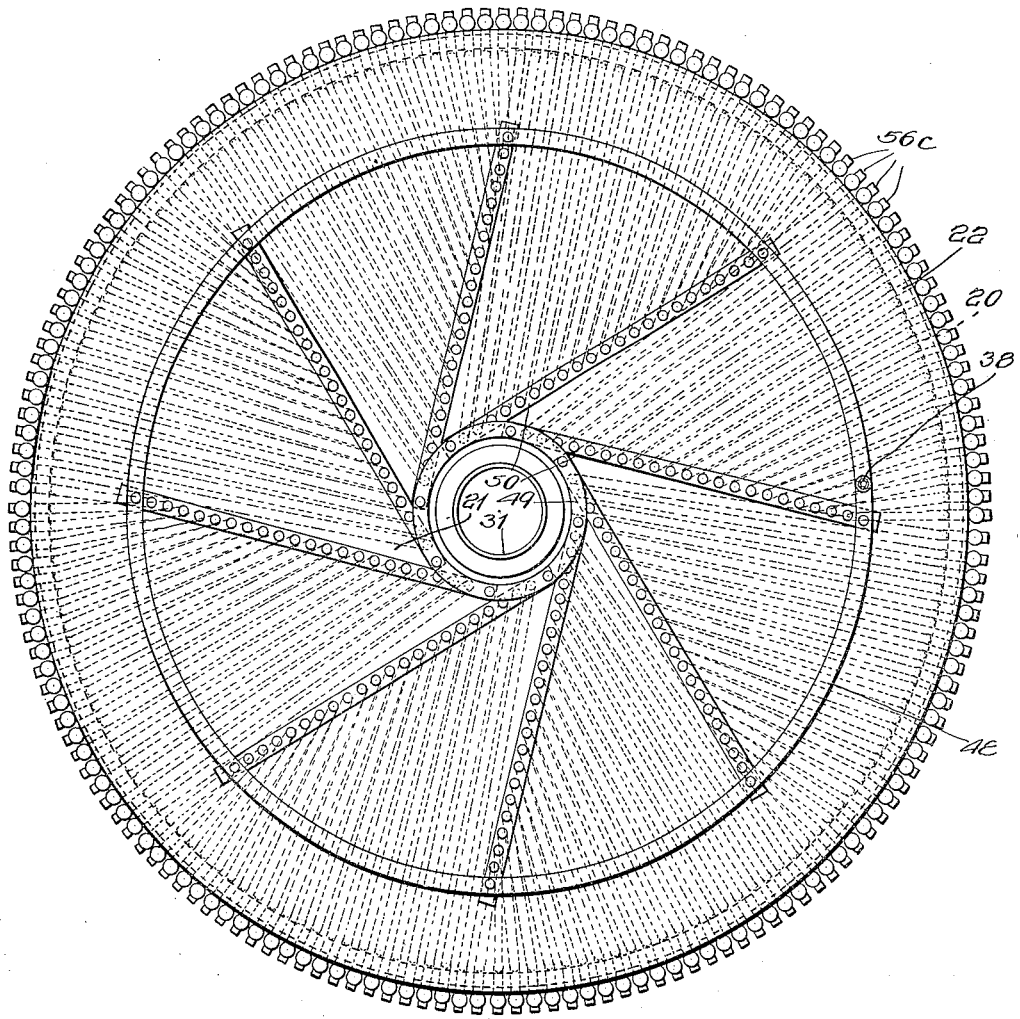
Fig. 4 is a plan view of the arrangement and construction of that portion of the boiler located at the top of the furnace.

The upper end of the furnace and the fuel inlet are the same as in the embodiment shown in Fig. 2. The gases descend along the side wall 61 of the upper portion of the furnace and enter the dark zone 71 through the constricted passage 77 and after cooling they escape through a plurality of outlets 64. Heat is transmitted from the descending gases to the contents of the sections 60a and 60b in the same manner as described for the sections 56a and 56b.

The hearth 65 is parabolic in vertical cross section and has a plurality of tuyères or air inlet passages 70 through which a supplementary supply of air is fed into the furnace under forced draft. The supplementary air supply is delivered from a source (not shown), through a main conduit 68 and branch conduits 69, to an annular space 67 formed within the side walls 66 of the hearth. The tuyères 70 connect the space 67 with the hearth 65 and they open into the hearth at angles substantially perpendicular to the inner parabolic surface. The inclination of the radially extending tuyères 70 causes the air stream discharged therefrom to converge along the vertical center line of the furnace. The upper end of the hearth 65 has a smaller diameter than the main body of the furnace and the discharge of air from the hearth at a high velocity under pressure tends to cause a low pressure area around the outer perimeter of the furnace. The upward inclination of the tuyères creates a maximum pressure at the center of the furnace which diminishes outwardly to a vacuum of approximately five hundredths of an inch at the outer perimeter as determined by experiment. This slight vacuum, or approximately balanced draft, surrounding the combustion area is conducive to a low velocity of gas through the restricted annular passage way 72 and through the dark zone 71. The temperature of the furnace is such that the residue of the products of combustion is formed into liquid slag and flows from the bottom of the hearth 65 through a pipe.

The vertical stacks of coils 60a and 60b positioned in the radiant heat zone, extend along diametrical lines with the inner end portions of the coils spaced apart substantially the same amount as the sections 60c which form a lining for the wall 60 surrounding the radiant heat zone. The outer ends of the vertical stacks of coil sections 60a and 60b are spaced much further apart than the inner ends. The low velocity of the descending gases insures a complete abstraction of their heat by the contents of the coil sections 60a and 60b, since the gases thereby remain in the zone 71 a sufficient time to permit the complete transfer notwithstanding the relatively large open spaces between the stacks of coils.

Thus it will be seen that I have provided a novel heat absorber whereby water may be raised to the maximum temperature at which it will efficiently absorb heat under pressures above the corresponding critical, and wherein the water is caused to flow in parallel through a plurality of conduits each of such a length that sufficient heat to raise the water to the predetermined maximum temperature is imparted to the water during one pass of the water through the conduit.

Having thus described my invention, it is obvious that various immaterial modifications may be made in the same without departing from the spirit of my invention; hence I do not wish to be understood as limiting myself to the exact form, construction, arrangement and combination of parts herein shown and described or uses mentioned.

What I claim as new and desire to secure by Letters Patent is:

1. In a heat absorber of the kind described, a closed furnace bounded by vertically extending side walls, a cover and a floor, a hearth positioned in the bottom of the furnace, said hearth having side walls, the outer surfaces of which are spaced apart from the side walls of the furnace to form a dark zone, the floor of said furnace underneath said dark zone having a plurality of outlet openings, the side walls of said furnace above the hearth being lined by a plurality of vertically extending closely spaced tubes, the lower portion of each of said tubes comprising a plurality of overlying horizontal lengths connected at their ends to form a coil in said dark zone, a plurality of headers positioned above said cover, said tubes being turned inwardly to connect with said headers with their inturned end portions forming a lining for the furnace cover.

2. In a heat absorber of the kind described, a closed furnace bounded by vertically extending side walls, a cover and a floor, a hearth positioned in the bottom of the furnace, said hearth having side walls, the outer surfaces of which are spaced apart from the side walls of the furnace to form a dark zone, the floor of said furnace underneath said dark zone having a plurality of outlet openings, the side walls of said furnace above the hearth being lined by a plurality of vertically extending closely spaced tubes, the lower portion of each of said tubes comprising a plurality of overlying horizontal lengths connected at their ends to form a coil in said dark zone, a plurality of headers radiating outwardly from the central portions of said cover, said tubes being turned inwardly to connect with said headers with their inturned end portions forming a lining for the furnace cover.

3. In a heat absorber of the kind described, a furnace comprising a vertical cylinder having closed ends, a hearth positioned in the bottom of the furnace, said hearth having side walls, the outer surfaces of which are cylindrical and spaced from the side wall of the furnace to form an annular shaped space, the end of the furnace underneath said space having a plurality of outlet openings, the side walls of said furnace above the hearth being lined by a plurality of vertically extending closely spaced tubes, the lower portion of each of said tubes comprising a plurality of overlying radially extending horizontal lengths connected at their ends to form a coil in said annular space, and a plurality of headers positioned above said cover, the upper end of said tubes each being turned inwardly to connect with one of said headers with their inturned portions forming a lining for said cover.

4. In a heat absorber of the kind described, a furnace comprising a vertical cylinder having closed ends, a hearth positioned in the bottom of the furnace, said hearth having side walls, the outer surfaces of which are cylindrical and spaced from the side wall of the furnace to form an annular shaped space, the end of the furnace underneath said space having a plurality of outlet openings, the side walls of said furnace above the hearth being lined by a plurality of vertically extending closely spaced tubes, the lower portion of each of said tubes comprising a plurality of overlying radially extending horizontal lengths connected at their ends to form a coil in said annular space, and a plurality of headers radiating outwardly from the central portion of said cover, said tubes each being turned inwardly to connect with one of said headers with their inturned portions forming a lining for said cover.

5. In a heat absorber of the kind described, a furnace comprising a vertical cylinder having closed ends, a hearth positioned in the bottom of the furnace, said hearth having side walls, the outer surfaces of which are cylindrical and spaced apart from the side wall of the furnace to form an annular shaped space, the end of said furnace underneath said space having a plurality of outlet openings, the inner surfaces of said hearth being parabolic in cross sections, the side walls of said furnace above the hearth being lined by a plurality of vertically extending closely spaced tubes, the lower portion of each of said tubes comprising a plurality of overlying radially extending horizontal lengths connected at their ends to form a coil in said annular space and a plurality of headers positioned above said cover, the upper end of said tubes each being turned inwardly to connect with one of said headers with their inturned end portions forming a lining for said cover.

In witness whereof, I hereunto subscribe my name this 1st day of May A. D., 1931.

GEORGE LASKER.